Feb. 24, 1959      E. SHOHAN      2,874,979

IRRIGATION COUPLING WITH A REMOVABLE SEAL

Filed Aug. 9, 1954      3 Sheets-Sheet 1

INVENTOR.
ELLIOT SHOHAN
BY
J. F. Cuneo
ATTORNEY

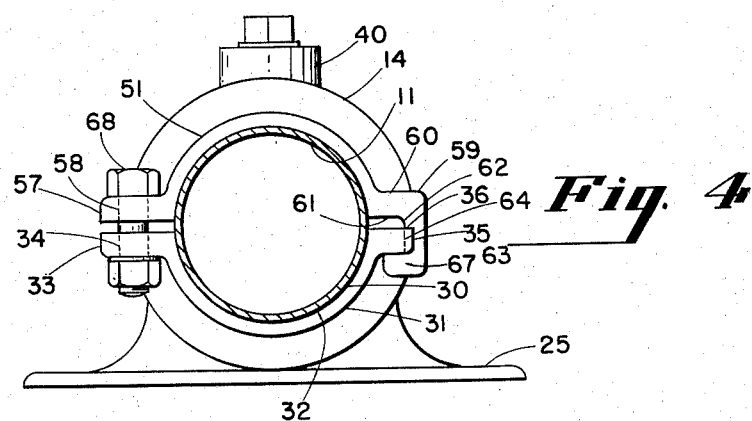
Fig. 4
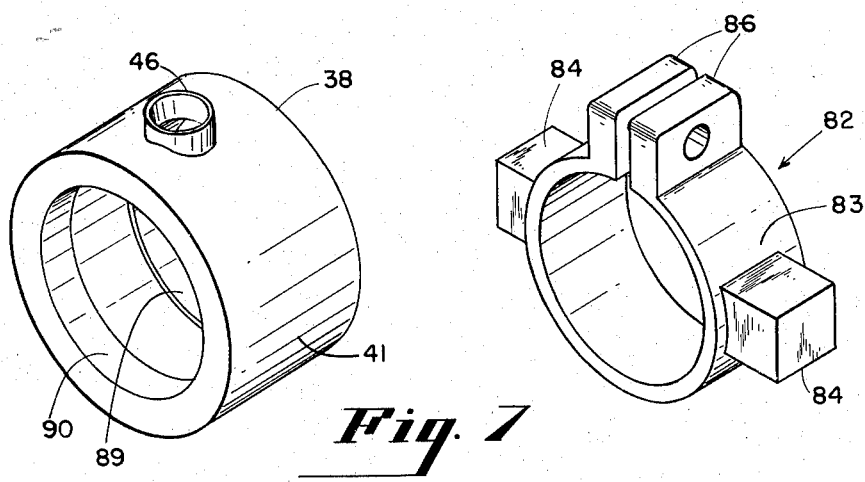
Fig. 7
Fig. 5
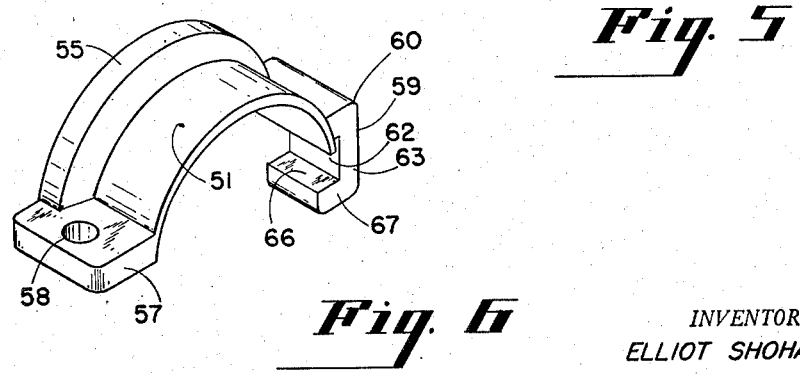
Fig. 6
INVENTOR.
ELLIOT SHOHAN
BY
ATTORNEY Feb. 24, 1959     E. SHOHAN     2,874,979
IRRIGATION COUPLING WITH A REMOVABLE SEAL
Filed Aug. 9, 1954     3 Sheets-Sheet 3

INVENTOR.
ELLIOT SHOHAN
BY
*J. F. Cuneo*
ATTORNEY

United States Patent Office 2,874,979
Patented Feb. 24, 1959

2,874,979
IRRIGATION COUPLING WITH A REMOVABLE SEAL

Elliot Shohan, San Bernardino, Calif.

Application August 9, 1954, Serial No. 448,469

5 Claims. (Cl. 285—6)

This invention relates to an improved pipe coupling and particularly to a quickly detachable coupling suitable for use in temporary and portable pipe line assemblies such as are usually employed for irrigation, mining and similar operations.

Portable pipe lines for irrigating and similar functions are usually set up for temporary use and should therefore be easy to assemble and take down. The lines are made of pipe sections, each section usually varying between twenty and forty feet in length. The pipe is thin walled and is generally assembled and taken down by a single operator.

A purpose of my invention is to provide an improved, rugged, simple and easily operable pipe coupling that will permit the operator to merely thrust one end of a pipe length into the coupling to effect a water tight connection.

A further purpose of my invention is to provide a coupling of the type indicated, in which the connections between the pipes and coupling are made water tight simply by the pressure of the water within the coupling acting on a gasket.

Another purpose of my invention is to provide a coupling of the type described, suitable for use with thin walled, light weight tubing for conducting water and the like, that does not require screw threads or threaded fittings to assemble lengths of tubing or pipe together.

An additional purpose of my invention is to provide a coupling of the type indicated having a pipe support guide and ramp on the quick connect and disconnect end thereof, that will assist in guiding the end of a pipe into the opening in the coupling, and will also serve to protect the end of the pipe from damage and keep it out of the ground while it is being assembled.

Another purpose of my invention is to provide a coupling that requires only one gasket to seal the ends of the principal incoming and outgoing pipe against leakage between the pipes and coupling.

A related purpose is to provide a coupling of the type indicated having means for connecting spur lines or sprinklers thereto.

The manner in which these and related purposes of my invention are accomplished will be more clearly understood by referring to the following description and accompanying illustrative drawings in which:

Figure 4 is an end plan view of the latch clamp end of my improved coupling, to which the other pipe is secured and showing a latch clamp and pipe in place.

Figure 5 is an isometric view of one form of coupler clamp.

Figure 6 is an isometric view of one form of latch clamp.

Figure 7 is an isometric view showing the construction of the single gasket used in connection with my coupling.

Figure 1:
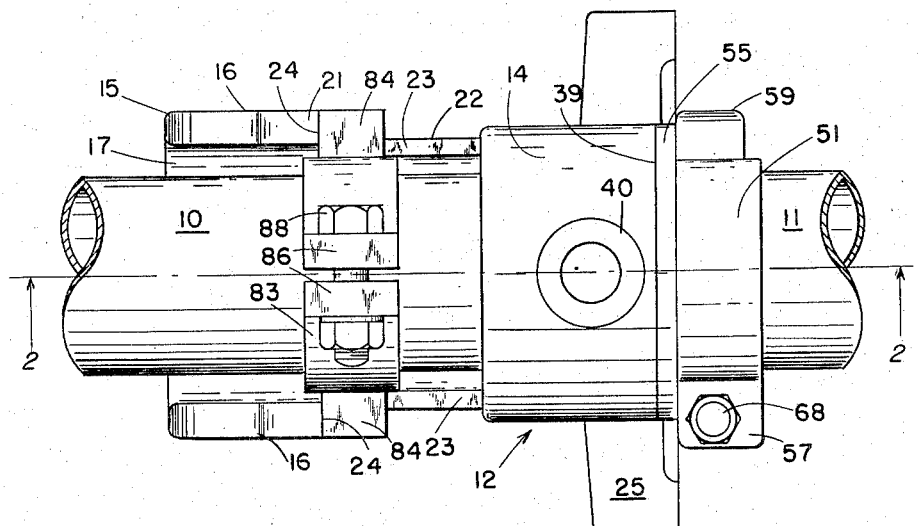
Figure 1 is a top plan view of one form of the pipe coupling according to my invention, showing pipes entering either end thereof.

Referring to Fig. 1, I have shown the end portions of light weight, thin walled pipes 10 and 11 inserted and secured to the ends of an improved coupling according to this invention. Coupling 12 comprises a tubular hollow body member 14 provided with a pipe coupling guide 15 that extends outwardly from the lower portion of one end of the hollow body a suitable distance and is preferably integral thereto. The outer surface of pipe coupling guide 15 preferably conforms to the outline of the outer portion of the hollow body member. The pipe coupling guide extends from the lowest surface of body member 14 upwardly a suitable distance on either side thereof and terminates at each of the upper edges 16 of the guide.

The inner surface 17 of pipe coupling guide 15 is substantially semicylindrical, having a radius that is larger than the outer radius of pipe 10. The end of hollow body member 14, adjoining pipe coupling guide 15, is provided with an opening that is slightly larger in diameter than the outer diameter of pipe 10 and extends into hollow body member 14 a short distance, forming a narrow cylindrical surface 19 and making the opening smaller in radius than surface 17.

An annular frustoconical ramp 20, resembling a funnel, commences at the outer edge of surface 19 and continues outwardly therefrom, increasing uniformly in diameter until it merges with the inner surface 17 of the pipe coupling guide. Ramp 20 assists the operator by steering the end of the pipe into the opening. This is particularly useful since in many instances the operator is working alone and may be supporting the pipe a considerable distance away from the opening in the coupling when he is making the connection. The ramp may form any desired angle with the longitudinal axis of the body member. The outwardly extending coupling guide also helps to steer the pipe to the proper position and serves to protect the end of the pipe from damage and also to keep the end of the pipe from digging into the ground and filling the pipe with dirt.

Upper side portions 21 of pipe coupling guide 15 are each provided with a notch 22 starting at a point adjoining hollow body 14 and extending outwardly a suitable distance. Notches 22 have longitudinally extending surfaces 23 preferably parallel to the longitudinal axis of the hollow body and positioned a suitable distance below the horizontal plane passing through the longitudinal axis of the body member. The outer vertical end surfaces of notches 22 extend between horizontal surfaces 23 and the corresponding upper edge 16 of the coupling guide.

A base 25 extends preferably from either side of the center of hollow body 14 and preferably from a position adjoining the end of hollow body 14 provided with opening 30. The base serves to prevent the coupling from rolling, may be an integral part of the hollow body or may be attached to it by any convenient means. In some instances it may be preferable to omit the base entirely.

The diameter of hollow body 14 adjoining the inner edge 26 of cylindrical surface 19 increases abruptly to form an annular shoulder 27 that is preferably vertical to the longitudinal axis of the body member. Shoulder 27 extends between cylindrical opening 19 and the cylindrical inner wall 28 of the hollow body, which is larger in diameter than opening 19. Inner wall 28 remains uniform in diameter up to a point near the opposite end of hollow body 14 and at this point the diameter reduces sharply to a diameter just slightly larger than the outside diameter of pipe 11, forming a second internal annular shoulder 29 adjoining opening 30.

An outwardly extending shelflike projection 31, substantially semicircular in profile and preferably integral with hollow body 14, adjoins the lower half of opening 30. The inner radius 32 of shelflike projection 31 corresponds to the radius of opening 30. The longitudinal horizontal edges of projection 31, located at either side of the center of the hollow body, terminate at a point preferably slightly below the horizontal plane passing through the longitudinal axis of the hollow body. The forward longitudinal edge is provided with a horizontally disposed ear 33 having a bore 34 of suitable diameter with its axis perpendicular to the horizontal surface of ear 33. The rear longitudinal edge of projection 31 is also provided with a horizontally disposed ear 35 having a U-shaped notch 36 in the outer vertical surface thereof that extends between the upper and lower horizontal surfaces of ear 35. The inner edge of notch 36 is preferably located a short distance outwardly from the point where shelf-like projection 31 joins hollow body 14. The upper horizontal surfaces of ears 33 and 35 preferably lie on the same plane, which plane is parallel to the horizontal plane passing through the longitudinal axis of the body member.

The end of hollow body 14, provided with opening 30, and extending above the upper surfaces of ears 33 and 35, terminates along the vertical plane passing through the annular inner surface of shoulder 29, thereby forming a large semicircular opening 39 in the upper half of that end portion of the hollow body. The radius of opening 39 corresponds to the radius of the inner wall 28 of hollow body 14 and leaves the upper portion of that side of hollow body 14 without a shoulder corresponding to the semiannular shoulder 29 in the lower portion adjoining opening 30.

The upper portion of body member 14 is preferably provided with a suitable threaded boss 40 that is preferably integral thereto, to which can be attached spur lines or sprinklers as required. When not in use the opening in boss 40 is plugged by means of a threaded plug.

Figure 2:
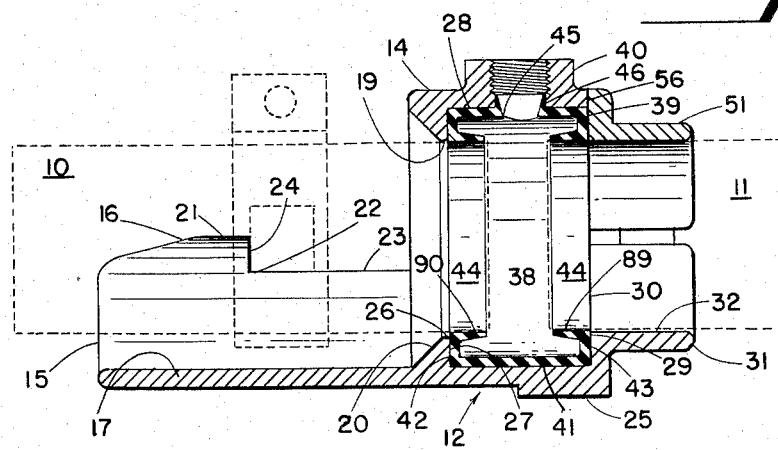
Figure 2 is a longitudinal cross section view taken on the line 2—2 of Figure 1.
Figure 3:
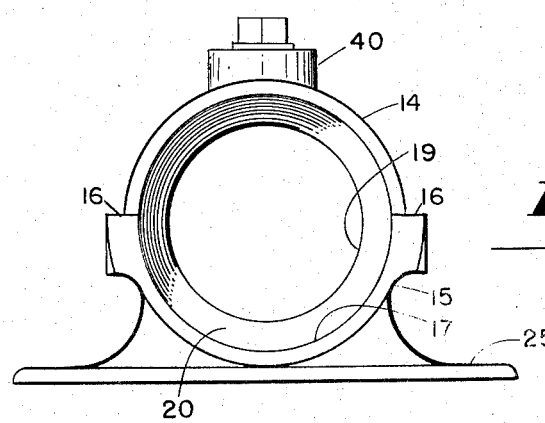
Figure 3 is an end plan view of the quick connecting coupler end of the improved coupling into which the end of a pipe provided with a coupler clamp is inserted.

An annular gasket 38 shown in Fig. 7 having the appearance of an elongated C when viewed in cross section as shown in Fig. 2, is inserted into hollow body 14 through the opening 39 in the upper portion of the body. Opening 39 is large enough to permit the easy passage of gasket 38. When annular gasket 38 is seated inside hollow body 14, surface 41 of the gasket rests against the inner wall of the body and surfaces 42 and 43 are in contact with shoulder 27, and partial shoulder 29 respectively. Gasket 38 is constructed of a resilient material, preferably rubber. The flexible end portions 44 are relatively limp and each form an annulus of a diameter to fit snugly against the exterior end portion of pipes 10 and 11. An opening 45, corresponding in size and position with the opening in boss 40, is provided in surface 41 of the gasket. A short annular portion 46 extends outwardly from this opening and is proportioned to fit into the inner unthreaded portion of the opening in boss 40.

A latch clamp 51 serves to hold pipe 11 securely against shelf-like projection 31. One form of this latch clamp comprises essentially an arcuate portion 52 having a substantially semicylindrical inner surface 53 which corresponds in radius to the radius of the inner surface of shelf-like projection 31. The clamp has a principal outer surface having a radius corresponding preferably to the outer radius of shelf-like projection 31, thereby reducing the weight of the clamp. The width of latch clamp 51 corresponds preferably to the distance between the outer end of semicircular shelf-like projection 31 and the edge of semicircular opening 39. Portion 55 of the latch clamp that adjoins semicircular opening 39 when the latch clamp is in place, has an outer radius that preferably corresponds to the outside radius of hollow body 14. The vertical side 56 of portion 55 that contacts opening 39, is flat and when latch clamp 51 is in place on shelf-like projection 31, provides a semicircular shoulder that corresponds to semicircular shoulder 29 in the lower portiton of the hollow body.

The forward end of latch clamp 51 is provided with a horizontally disposed ear 57 having a bore 58 that corresponds axially with bore 34 in ear 33 when the clamp is properly located. The rear end of latch clamp 51 is provided with a vertically disposed C-shaped projection 59 having the upper horizontal portion of the C extending from the rear end of the clamp and preferably integral therewith. The horizontal lower surface 61 of portion 60 lies preferably on the same plane as the one passing through the lower surface of ear 57.

The width of C-shaped projection 59 corresponds to the width of U-shaped notch 36 and thus permits the C-shaped projection to seat in the notch. Inner vertical surface 62 of vertical portion 63 of the C-shaped projection is positioned to permit it to contact the vertical surface 64 of notch 36 when bores 58 and 34 are in axial alignment. The length of vertical portion 63 is proportioned to permit upper surface 66 of lower horizontal portion 67 to contact the lower horizontal surface of ear 35 when the latch clamp is assembled to the coupler and around pipe 11. A bolt 68 holds the latch clamp securely in place and causes the clamp to securely grip pipe 11. The latching arrangement described above is only intended to be exemplary and any other equivalent construction may be employed.

In some instances it has been found preferable to employ a latch clamp similar to clamp 51 but provided with a foot or base. A feature of this type of construction is that it is possible to provide the same coupler with either a long or short base as may be required; for example, a coupler body may be used with long risers threaded into the boss to position the sprinklers, at the other end of the riser, a considerable distance above the ground. Such a system would require a long base to prevent the coupler from turning and the riser from leaning toward the ground, whereas a coupler having all portions of the system close to the ground could be adequately supported by a latch clamp having a short base or in some cases no base at all. Such a construction also has the advantage that a large number of couplers can be packed or shipped in much less space than would be required to ship couplers with permanent bases attached to the hollow body.

Figure 8:
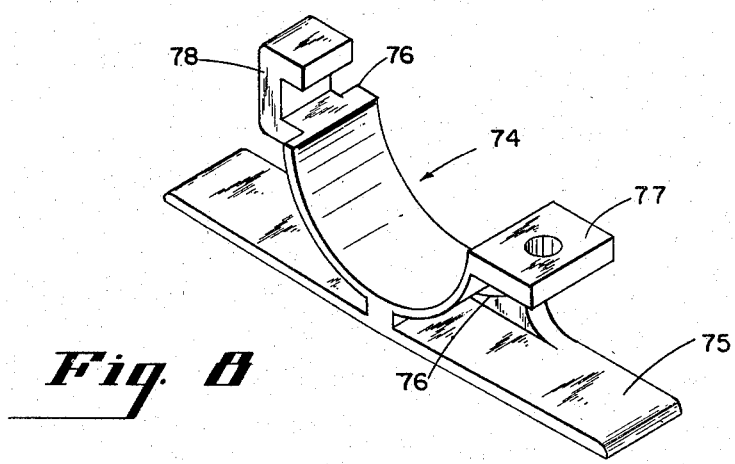
Figure 8 is an isometric view of a modified form of latch clamp having a base attached thereto.
Figure 9:
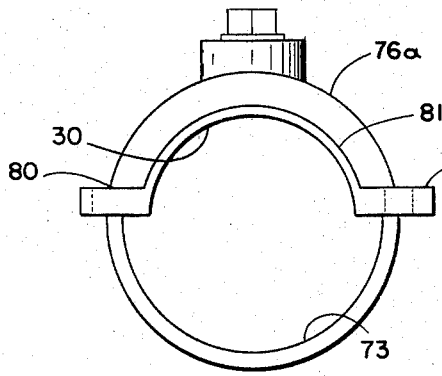
Figure 9 is an end view of a modified coupler body member to which the latch clamp of Figure 8 is applied.

A modified form of the latch clamp is shown in Fig. 8 and a modified coupler with which such a latch clamp is adapted to be used is shown in Fig. 9. Latch clamp 74 resembles the latch clamp used in Fig. 6 but is provided with a base 75 that extends on either side of the vertical radius of the latch clamp. The base is preferably attached to portion 76 of the clamp and is integral therewith, however, the base may be secured to the clamp by any other suitable means such as bolting, welding, brazing or similar means. The outer radius of portion 76 of the latch clamp preferably corresponds to the outside radius of modified hollow body portion 76a of the coupler, and has an inner radius corresponding to the radius of opening 30. Portion 76 contacts on the side the semicircular opening 73, when the clamp is in position. Unpressurized water from pipes inserted into a coupler provided with this form of latch clamp can drain downward between the clamp and the end of body 76a, so that the operator does not have to lift heavy waterfilled pipes in moving the equipment. Latch clamp 74 is provided with ear 77 which corresponds to ear 57 of clamp 51, and also with a C-shaped projection 78, which in this embodiment extends upwardly instead of downwardly as in Fig. 6. The latch clamp, either with or without a base, could be modified by providing the clamp with a bolting ear 77 at one end and a notched ear similar to ear 80 at the other end. In this construction shelf-like projection 81 extending outwardly from the hollow body portion as in Fig. 9, would be provided with an appropriately positioned C-shaped latching projection similar to 78 and would preferably extend downwardly and form an integral part of shelflike projection 81.

Coupler body 76a is provided with a bolting ear 79 and notched ear 80 at the opposite ends of shelflike projection 81 in the construction shown in Fig. 9.

Pipe 11 could also be secured to shelves 31 or 81 by providing the shelflike projection with bolting ears at each end and providing a clamp that would have corresponding bolting ears at each end. Such a clamp could be secured to the shelflike projection by a pair of bolts.

A coupler clamp 82 is adapted to be secured to the end portion of pipe 10 at a position that will permit the pipe to enter into the hollow body the proper distance when the coupler clamp is seated in notches 22 of the pipe coupling guide. Coupler clamp 82 comprises a split annulus 83 having an internal diameter corresponding to the external diameter of pipe 10 and is provided with outwardly extending, diametrically opposed lugs 84. Gap 85 in annulus 83 is preferably located equidistant between lugs 84. The ends of annulus 83 are each provided with outwardly extending bolting ears 86 that are preferably integral with the annulus having bores 87 to permit passage of a clamping bolt 88.

The distance between the lower edge of lugs 84 and the symmetrical diameter passing through the lugs, corresponds to the distance that surfaces 23 are located below the horizontal plane passing through the longitudinal axis of the body member.

The manner in which the coupling operates is as follows: gasket 38 is placed within the hollow body through the semicircular opening 39 or its equivalent, and seats between shoulders 27 and 29 with surface 41 of the gasket resting against the inner wall 28 of the body member. The upper annular portion 46 of the gasket is inserted in the lower unthreaded portion of the opening in boss 40. Pipe 11 is inserted into opening 30 and forced through the annular opening 89 formed by the corresponding short flexible portion 44 of the C-shaped gasket, at the same time resting on shelf-like projection 31. The C-shaped projection of latch clamp 51 is seated in notch 36 and the arcuate portion of the latch clamp passes over pipe 11. Side 56 of the latch clamp closes opening 39 and serves as a shoulder for the side portion of gasket 38 adjoining opening 39. Bolt 68 is introduced through the bores 34 and 58 and the nut is tightened until the pipe is secured rigidly between the clamp and shelf-like projection 31.

Coupler clamp 82 is bolted on pipe 10 at a position where it will permit the end of the pipe to seat in annular opening 90, formed by the other flexible end portion 44 of the C-shaped gasket, when lugs 84 are against the vertical surfaces 24 of notches 22. Once the coupler clamp has been secured to pipe 10, all the operator has to do to assemble the pipe to the line is to lay the end of the pipe 10 on pipe guide 15, with the lower surfaces of lugs 84 resting on edges 16 of the pipe coupling guide and push the pipe against the ramp 20. Thus the ramp will guide the end of the pipe into the opening 19 and into annular opening 90 of the gasket from any angle of approach of the pipe that is less than angularity of the ramp, all with respect to the axis of body 14. At all times the pipe is held at a sufficient angle with the horizontal to permit the lower surfaces of lugs 84 to slide easily on surfaces 16. When the pipe has entered into the body portion of the coupler a sufficient distance, lugs 84 will clear the vertical edge of the notches and will rest on surfaces 23 thus placing the pipe in longitudinal alignment with the coupling. The pipe is then pulled out until the outer vertical surfaces of lugs 84 are in contact with vertical shoulders 24 of notches 22.

It will be evident from what has been explained above that the pipe 10 may be somewhat laterally pivoted out of direct alignment with the hollow body member, while remaining coupled therewith, at least one lug 84 being engageable with a shoulder 24 to prevent uncoupling.

As the water in the system is placed under pressure, the short relatively limp portions 44 of the C-shaped gasket are pushed tightly against the outer surface of the pipe, thereby preventing leakage between the pipe and the coupling.

To disconnect the end of the pipe having the coupler clamp from the coupling, it is only necessary for the operator to raise the pipe at an angle sufficient to permit lugs 84 to clear shoulders 24 and pull the pipe free from the gasket and opening 19.

From the above description it will be apparent that I have provided an improved coupling particularly suited for use with light weight, thin walled irrigation tubing. The improved coupling is secured to one end of a pipe and the other end of the adjoining pipe section can be quickly and easily attached or detached from the coupling as required.

The single gasket construction is easy to install and eliminates the need for multiple gaskets and O-rings to prevent leakage whenever the pipe and system is subjected to water under pressure.

The combination pipe coupling guide and ramp serve to protect the end of the pipe from damage and dirt while it is being handled and also make it possible for the operator to easily insert the end of the pipe into the opening and into the gasket even though the operator is supporting the pipe at the balance point, which would normally be removed a considerable distance from the coupling. Thus, clearance between the guide 15 and the end of the pipe 10 being inserted into opening 19 prevents the pipe end from digging into dirt accumulated in the guide even though the pipe is raised at the balance point to a considerable angularity with the horizontal.

Various alterations may be made in the details of construction without departing from the scope of the present invention as defined by the following claims.

I claim:

1. An irrigation pipe coupling, comprising a longitudinally horizontally extending tubular body, an upwardly opening trough shaped end extension projecting longitudinally and rearwardly from said body, said extension having a pair of laterally spaced upstanding shoulders integral with the extension and facing said tubular body in longitudinally spaced relation therewith, said extension also having a pair of laterally spaced upper edges extending forwardly of said shoulders, an axially elongated pipe having its forward end inserted into and loosely fitting the open end of said tubular body with said pipe end adapted to be longitudinally movable and pivotally supported within said tubular body, and a pair of laterally spaced projections on said pipe end respectively seated on the extension upper edges forward of said shoulders and supporting the pipe, said projections being movable with the pipe into engagement with said shoulders for holding the pipe against endwise removal from said tubular body, said pipe being adapted to be upwardly inclined remotely from and relative to said tubular body while remaining supported thereby to raise both of said projections above said shoulders so that the projections will clear said shoulders upon rearward pipe movement withdrawing the pipe end from said tubular body, a second axially elongated pipe having its rearward end inserted into the opposite open end of said tubular body, clamp means having a substantially semicircular groove fitting said rearward pipe end formed integral with and projecting forwardly from said tubular body, a clamp member having a substantially semi-circular groove fitting the opposite side of said rearward pipe end, means removably attaching said clamp member to said body and clamping said clamp means and said clamp member on said rearward pipe end, an annular inwardly facing groove in said tubular body, one end of said annular groove being adjacent the rearward end of said tubular body and the other end of said annular groove being formed by the rearward ends of said clamp means and said clamp member, a lateral pipe receiving opening in said tubular body centrally of said annular groove, a one-piece tubular rubber seal received in said body and having re-entrant annular lips surrounding the inserted pipe ends for sealing engagement therewith, said seal lips and pipe ends being longitudinally spaced apart in said body, and an opening in said seal between said lips aligned with said pipe receiving opening, said clamp member blocking the end of said seal and being removable from said body to facilitate endwise withdrawal of the seal from said body.

2. The invention as defined in claim 1 wherein said clamp member carries a base extending laterally at opposite sides of said body for ground supporting said coupling.

3. The invention as set forth in claim 1 wherein said tubular body carries a base extending laterally at opposite sides of said body for ground supporting said coupling.

4. The invention as defined in claim 1 wherein said extension has a pair of laterally spaced upwardly facing cam surfaces sloping forwardly and upwardly rearward of said shoulders for camming engagement with said projections.

5. The invention as defined in claim 1 including a clamp ring on the first mentioned pipe and in which said projections comprise laterally extending lugs carried by said clamp ring, and wherein each of said extension upper edges has length forwardly of said shoulders that is substantially greater than the forward overall dimension of each of said lugs so that the lugs are freely slidable with the pipe forwardly and rearwardly along said edges while remaining confined between said extension shoulders and said tubular body.

References Cited in the file of this patent
UNITED STATES PATENTS

| | | |
|---|---|---|
| 792,085 | Stuttle | June 13, 1905 |
| 982,028 | Austin | Jan. 17, 1911 |
| 1,994,007 | Tallant | Mar. 12, 1935 |
| 2,047,569 | Loomis | July 14, 1936 |
| 2,067,428 | Wallis | Jan. 12, 1937 |
| 2,132,769 | Wallis | Oct. 11, 1938 |
| 2,138,135 | Boucher | Nov. 29, 1938 |
| 2,259,940 | Nathan | Oct. 21, 1941 |
| 2,364,383 | Neesen | Dec. 5, 1943 |
| 2,470,539 | Wyss | May 17, 1949 |
| 2,487,311 | Chapin | Nov. 8, 1949 |
| 2,494,855 | Anderson | Jan. 17, 1950 |
| 2,510,477 | Montgomery | June 6, 1950 |
| 2,573,203 | Kinney | Oct. 30, 1951 |
| 2,635,901 | Osborn | Apr. 21, 1953 |
| 2,643,138 | Jacobs | June 23, 1953 |
| 2,657,079 | David | Oct. 27, 1953 |
| 2,672,356 | Crockett | Mar. 16, 1954 |
| 2,675,254 | Davis | Apr. 13, 1954 |